United States Patent Office 3,464,189
Patented Sept. 2, 1969

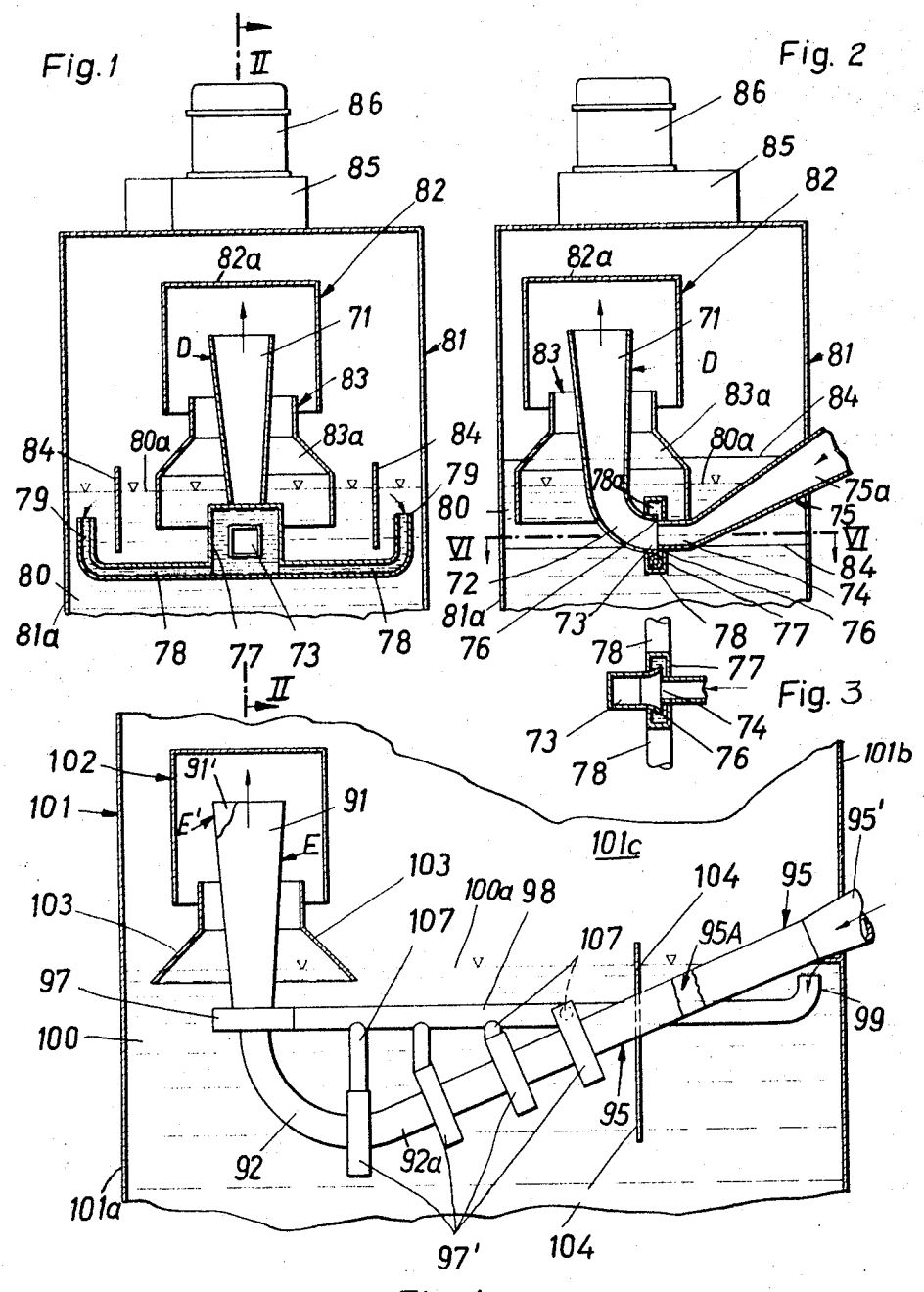

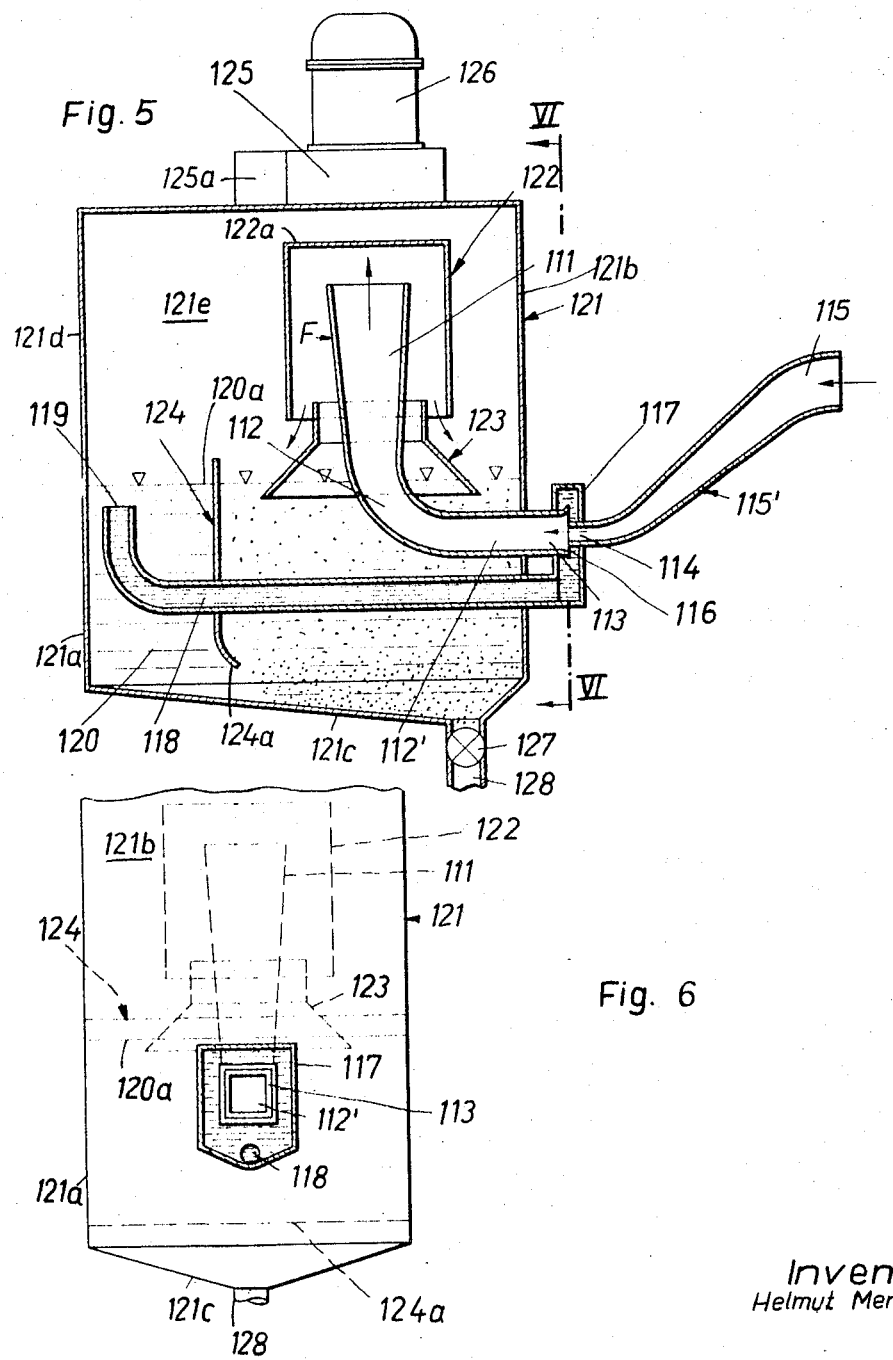

3,464,189
GAS CLEANING APPARATUS
Helmut Mergenthaler, Jesingen, near Kirchheim unter Teck, Wurttemberg, Germany, assignor to Otto Keller, Jesingen near Kirchheim unter Teck, Wurttemberg, Germany
Filed May 6, 1965, Ser. No. 453,646
Claims priority, application Germany, May 19, 1964, K 52,984; September 23, 1964, K 54,069
Int. Cl. B01d 47/02
U.S. Cl. 55—256　　　　　　　　　　　　　　　8 Claims

ABSTRACT OF THE DISCLOSURE

A gas cleaning apparatus in which a stream of gas to be cleaned is fed through a nozzle into the throat of a tubular member having a diffuser extending upwardly from the throat. The nozzle defines with the throat an annular gap through which water contained in a tank surrounding the gap is sucked and atomized so that impurities contained in the gas will adhere to the atomized liquid and will settle at the botom of the tank. The gap is surrounded by shielding means which communicate with the tank through a tube having an inlet end spaced from the bottom of the tank so that impurities settling on the tank bottom will not be recirculated through the tubular member.

---

The present invention relates to gas cleaning apparatus in general, and more particularly to a scrubber which removes dust, sulfur dioxide and/or other impurities from contaminated gases in industrial plants and other establishments. Still more particularly, the invention relates to a gas cleaning apparatus or scrubber of the wet type wherein dust-laden air or another contaminated gas is sucked or blown through one or more Venturis.

In conventional scrubbers, a stream of dust-laden air or another contaminated gas is caused to enter the convergent portion or skirt and thereupon passes downwardly through the throat and finally through the diffuser of a Venturi. The gas is accelerated in the skirt and reaches a maximum velocity at the time it enters the throat of the Venturi. The liquid, usually water, is admited into the throat, for example, by resorting to one or more spray nozzles which are located at the inlet end of or in the throat proper and which discharge a spray of atomized liquid in the direction of gas flow. It is also known to provide the throat of a Venturi with one or more nozzles which discharge highly compressed liquid radially inwardly so that such liquid enters in a direction at right angles to the direction of gas flow. In certain other types of conventional scrubbers, the skirt is again located at the upper end of the Venturi and a constant stream of liquid is caused to overflow the intake end of the skirt so that such liquid is atomized by the stream of contaminated gas which flows downwardly. Thus, in all such conventional scrubbers, the diffuser is located at a level below the throat of the Venturi. It was found that such mounting of the Venturi brings about a number of drawbacks, particularly as regards the mounting of the spray eliminating equipment which separates the atomized liquid from the gas, and also as regards the feed of liquid into the Venturi. The liquid which is injected through nozzles or which overflows into the skirt must be compressed or lifted by resorting to pumps which add considerably to the initial and maintenance cost of the apparatus. Furthermore, the liquid which is admitted through nozzles must be filtered to insure that the nozzles are not clogged by solids.

Accordingly, it is an important object of the present invention to provide a very simple, compact rugged and efficient gas cleaning apparatus which can be operated without interruptions for long periods of time, wherein the liquid which removes solid impurities from contaminated gases need not be circulated by pumps, and wherein the liquid need not be filtered prior to entering one or more Venturis wherein it mixes with streams of contaminated gases.

Another object of the invention is to provide a gas cleaning or scrubbing apparatus wherein the liquid is atomized by contaminated gases and wherein such liquid is then separated from the gases and is repeatedly brought into contact with freshly admitted solids-containing gases so that the same liquid may be used again and again without resorting to filters and similar expensive accessories.

A further object of the invention is to provide a gas cleaning or scrubbing apparatus wherein the solids which are separated from a stream of contaminated gases are automatically induced to settle in the liquid bath so that such solids may be removed from the apparatus while the latter is in actual use.

An additional object of the invention is to provide a gas cleaning or scrubbing apparatus which is much more compact, less expensive and more reliable than any such conventional gas scrubbers, having the same capacity, of which I am aware at this time.

Still another object of the invention is to provide a novel spray eliminating device which removes atomized liquid and solid impurities (which adhere to atomized liquid) from the stream of gases issuing from the outlet of a Venturi and to construct the spray eliminating device in such a way that it insures complete or nearly complete separation of atomized liquid in a very small area and in such a way that such liquid may be returned to a predetermined portion or zone of the liquid bath.

A concomitant object of the invention is to provide a novel sedimentation promotion device which may be utilized in an apparatus of the above outlined characteristics and to construct this device in such a way that it maintains at least one zone of the liquid bath substantially free of solid impurities.

Still another object of the invention is to provide a gas scrubber whose output may be selected or varied at will, which can be produced in any desired size or shape so as to fit into any space which is available in an industrial plant, which can be operated by conveying the contaminated gas by suction or at superatmospheric pressure, and wherein all such parts which are likely to require frequent inspection are readily accessible without necesitating even partial dismantling of the remaining components.

A further object of the invention is to provide a gas scrubber which can be used not only to remove solid impurities from but also to cool a very hot gas so that the gas is thoroughly cooled while it is being separated from solid and other impurities.

A further object of the invention is to provide a gas scrubbing apparatus whose parts need not be assembled into an integral unit so that, depending on the space which is available in a plant or another establishment, at least the structure which causes the contaminated gas to flow through one or more Venturis can be located at any desired distance from the liquid bath.

Briefly stated, one feature of my invention resides in the provision of a gas cleaning apparatus which comprises a Venturi having a throat and a diffuser located above the throat so that gas entering the diffuser after passing through the throat will flow upwardly while advancing through at least a portion of the diffuser, a supply conduit comprising a nozzle having a discharge end which is at least partially surrounded by and defines at least one liquid-admitting gap with the throat of the Venturi, a tank containing a liquid bath filling at least a portion of the gap between the nozzle and the throat and having an upper surface located at a level which is at least as high as the level of the discharge end of the nozzle, at least when the apparatus is in use, so that such liquid overflows the discharge end of the nozzle, and a suction fan, a blower or another suitable suction- or pressure-generating device which conveys a stream of contaminated solids-containing gas through the supply conduit so that such gas atomizes the overflowing liquid during its passage from the nozzle into the diffuser whereby the atomizer liquid coats solid impurities and is subsequently separated from the gas stream.

In many types of my improved gas cleaning apparatus, the static liquid level (i.e., the level of the liquid surface when the apparatus is idle) is located above the discharge end of the nozzle so that such liquid actually fills the supply conduit and the Venturi to the same level as in the tank. However, it is also possible to mount the Venturi and the supply conduit in such a way that the static liquid level is below the discharge end of the nozzle as long as the operating level of the liquid is sufficiently high to insure that a steady stream of liquid will tend to overflow into the nozzle and will be entrained and atomized by the stream of gas which is sucked or blown through the supply conduit and into the Venturi.

The novel features which are considered as characteristic of the invention are set forth in particular in the appended claims. The improved gas cleaning apparatus itself, however, both as to its construction and its mode of operation, together with additional features and advantages thereof, will be best understood upon perusal of the following detailed description of certain specific embodiments with reference to the accompanying drawings, in which:

FIG. 1 is a vertical section through a portion of a gas cleaning apparatus wherein liquid admitted into a Venturi-like arrangement is drawn from such zones of the bath which contain the lowest percentage of impurities;

FIG. 2 is a vertical section as seen in the direction of arrows from the line II—II of FIG. 1;

FIG. 3 is a fragmentary horizontal section substantially as seen in the direction of arrows from the line III—III of FIG. 2;

FIG. 4 is a fragmentary vertical section through a second gas cleaning apparatus which comprises a plurality of Venturi-like arrangement and wherein each supply conduit comprises a series of nozzles;

FIG. 5 is a vertical section through a third gas clean- of Venturi-like arrangements and wherein each supply conduit is located externally of the housing;

FIG. 6 is a fragmentary partly elevational and partly vertical sectional view as seen in the direction of arrows from the line VI—VI of FIG. 5.

One type of air cleaner which is provided with tubes for admission of relatively clean liquid to the gap formed the nozzle of a supply conduit supplying dust laden gas and the throat of a tubular member from which a diffuser extends upwardly and with sedimentation promoting skimmer walls is illustrated in FIGS. 1 to 3. In this apparatus, the axis of the diffuser 71 is vertical and the lower part of the tubular member D extends well below the static level 80a of the liquid bath 80. This bath is accommodated in the lower portion or tank 81a of a housing 81. The tank 81a is assumed to contain a supply of water. An intermediate portion 72 of the member D is curved to form a bend of substantially 90 degrees so that the axis of the throat 73 is horizontal or nearly horizontal. The discharge end of the gas-admitting nozzle 74 is substantially coplanar with the intake end of the member D but its cross-sectional area is smaller than that of the throat 73 so that the parts 73, 74 define between themselves an annular gap 76 which serves to admit water into the throat, i.e., into the stream of dust-laden air which is fed by a supply conduit 75. The nozzle 74 constitutes the lower end portion of the supply conduit 75, and the cross-sectional area of this conduit diminishes gradually all the way from its inlet 75a to the nozzle 74.

The annular gap 76 is sealingly surrounded by an annular shielding member 77 which is welded or otherwise secured to the throat 73 and to the nozzle 74 so that it defines an annular compartment 78a which feeds water into the gap 76. In the embodiment of FIGS. 1 to 3, the shielding member 77 is of square cross-sectional outline (see particularly FIG. 1), and the same holds true for the nozzle 74 and throat 73. However, it is clear that the outline of each of these parts may be changed to circular or to another polygonal outline.

The shielding member 77 is connected with two liquid-admitting tubes 78 which extend horizontally from the lower portion of this member and whose intake ends 79 extend vertically upwardly to a level at least slightly below the static level 80a; for example, the distance between the open ends 79 of the tubes 78 and the level 80a may be in the range of 70–150 mm.

The upper portion of the diffuser 71 is spacedly surrounded by a cylindrical or bell-shaped spray eliminator 82. The upper end of the spray eliminator 82 is closed by a horizontal plate-like baffle 82a which deflects the onrushing air stream so that the stream flows downwardly along the internal surface of the spray eliminator whereby the solid and liquid matter accmulate on such internal surface to trickle down into the bath 80. It is clear that the spray eliminator 82 need not be of circular or hollow cylindrical cross section but may have a square or other polygonal cross-sectional outline. It is also possible to replace the spray eliminator 82 and its baffle 82a with an inverted U-shaped baffle of sheet metal or the like whose median portion or web corresponds to the baffle 82a and whose downwardly extending flanges are disposed at the opposite sides of and remain spaced from the diffuser 71. Such U-shaped baffle may be secured to the housing 81.

The lower end of the spray eliminator 82 is open and surrounds with clearance an annular deflector 83 which has an outwardly and downwardly diverging median portion 83a. The liquid matter trickling down the internal surface of the spray eliminator 82 descends onto the external surface of the conical portion 83a and flows back into the bath 80. The deflector dips into the bath 80 and thus insures that the liquid trickling down along its external surface will cause a minimum of turbulence such as could stir up the solids which have settled in the bottom zone of the tank 81a. The shape of the deflector 83 may be changed as long as it can perform the just outlined function.

The air cleaner of FIGS. 1 to 3 further comprises two or more vertical plate-like skimmer walls 84 which dip into the bath 80 in a zone located at a distance from and outwardly of the deflector 83. The skimmer walls 84 serve the aforedescribed purpose, namely, to compel currents of water flowing toward the intake ends 79 of the tubes 78 to flow downwardly along the inner sides of the walls 84 and then upwardly along the outer sides of such walls whereby the solid impurities carried by such currents move closer to the bottom of the tank 81a and are much more likely to be separated from the currents. In other words, the skimmer walls 84 actually promote sedimentation of solid matter in the tank and insure that water entering the intake ends 79 of the tubes 78 is relatively clean. Thus, the annular compartment 78a of the shielding member 77 will be filled with water which contains a minimum of solids. The front and rear ends of the skimmer walls are fixed to the corresponding side walls of the housing 81 and their depth is selected in such a way that the currents of liquid flowing toward the intake ends 79 of the tubes 78 need not penetrate into the sludge which accumulates at the very bottom of the tank 81a. The walls 84 accomplish their stated purposes for two reasons, namely, because they compel the solid impurities to move nearer to the bottom of the tank 81a and also because they insure that currents of water flowing from the zone adjacent to the deflector 83 toward the intake ends 79 of the tubes 78 will require more time which is also conducive of sedimentation.

Closely adjacent horzontal lines shown in FIGS. 1 to 3 denote such water which has entered the tubes 78 and which fills the annular compartment 78a of the shielding member 77. The top wall of the housing supports a suction fan 85 which is driven by an electric motor 86.

It will be noted that the air cleaner of FIGS. 4 to 6 differentiates from the previously described air cleaners in several respects including the provision of the deflector 83, the provsion of the annualr shielding member 77, and the provision of tubes 78 which draw liquid from zones located outsde of the skimmer walls 84. In addition, the throat 73 of the tubular member D receves a stream of dust-laden air from the lowermost portion (nozzle 74) of the supply conduit 75. The nozzle 74 is located well below the static liquid level 80a because, and contrary to the mounting of the Venturis A, B, C and C', the throat 73 of the tubular member D is also located well below the level 80a. In other words, a portion of the diffuser 71 actually dips into the bath 80 and, in fact, the throat 73 and the nozzle 74 may be accommodated close to the bottom wall of the tank 81a. This prevents the formation of a water sack which could lead to clogging of the apparatus.

FIG. 4 illustrates a portion of a further air cleaner which comprises a series of nozzles. The housing 101 of the air cleaner accommodates a spray eliminator 102 which surrounds the diffuser 91 of a tubular member E. The lower portion 101a of the housing 101 forms a tank containing a liquid bath 100 whose static level is indicated at 100a. The numerals 103 denote a composite deflector which extends into the path of liquid suspension trickling along the vertical portion of the spray eliminator 102 so that such liquid creates a minimum of turbulence when it reaches the bath 100. The supply conduit 95 comprises a plurality of sections and has an inlet 95' which is located externally of the housing 101. The conduit 95 then slopes downwardly into the bath 100. A vertical skimmer wall 104 dips into the liquid bath in a zone between the right-hand deflector 103 and the upwardly extending intake end 99 of a horizontal tube 98 which is submerged in the bath and is provided with a series of branch lines 107 each leading to a separate annular shielding member 97'. The left-hand end of the tube 98 discharges directly into a further shielding member 97 which is located directly below the diffuser 91.

The spray eliminator 102 is an inverted U-shaped body which extends all the way between the front and rear walls of the housing 102 (such configuration of the spray eliminator was mentioned hereinbefore), and the composite deflector comprises two elongated substantially V-shaped plates 103 which also extend all the way between the front and rear walls of the housing. The same holds true for the skimmer wall 104.

The supply conduit 95 tapers very slightly in a direction toward its lower end so that the inflowing stream of dust-laden air is accelerated mainly while flowing through the inlet 95'. The axis of the diffuser is vertical and its lower end extends well below the static liquid level 101a. The throat of the tubular member E is surrounded by the shielding member 97 which also surrounds the nozzle at the discharge end of the foremost section or bend 92 of the supply conduit 95. This bend 92 has an intake end forming a throat which is connected with the foremost annular shielding member 97'. The interior of each of the shilding members 97, 97' resembles the interior of the shielding member 77 shown in FIGS. 1 to 3. The axis of the nozzle in the shielding member 97 is vertical but the axes of nozzles in the shielding members 97' are horizontal or nearly horizontal. The foremost shielding member 97' is located at the lowermost point of the second section 92a of the supply conduit 95, i.e., directly upstream of the bend 92, and the remaining shielding members 97' are substantially equidistant from each other and from the foremost member 97'. As shown, the intake end 99 of the tube 98 is located at a considerable distance from the skimmer wall 104 to make sure that liquid flowing into the tube 98 contains a very low percentage of solids. This intake end 99 is located in the zone between the skimmer wall 104 and the side wall 101b of the housing 101 so that the currents of liquid flowing to the intake end 99 lose at least the major percentage of their solid fraction while flowing downwardly and then upwardly along the sides of the skimmer wall 104. It is obvious that the shielding members 97 and 97' may receive liquid from two or more tubes and that such tubes may be arranged in a manner as shown in FIG. 3. The same holds true for the spray eliminator 102, deflector 103 and the skimmer wall 104.

Furthermore, and still referring to FIG. 4, the air cleaner therein shown may comprise two, three or more tubular members E whose diffusers 91 can be arranged in a row within the confines of the U-shaped spray eliminator 91. In such apparatus, the shielding members 97' of two adjoining supply conduits may receive liquid from a common tube 98. The possibility of installing two or more tubular members is indicated in FIG. 4 wherein a portion of the diffuser 91 is broken away to show the upper part of a second diffuser 91' forming part of a second tubular member E'. Also, a portion of the supply conduit 95 has been broken away to show a second supply conduit 95A serving to feed a stream of dust-laden air to the second tubular member E'.

A very important advantage of the air cleaner shown in FIG. 4 is that it may remove solids from very hot gases. Such gases are cooled gradually by atomized liquid which is admitted in consecutive shielding members 97' and finally in the shielding member 97 so that the stream entering the diffuser 91 is relatively cool and, after passing through the upper part of the chamber 101c in the housing 101 and through the suction fan (not shown) may be discharged directly into the surrounding atmosphere. While the air cleaner of FIG. 4 requires a more powerful suction fan than the air cleaners of FIGS. 1–3, its use for treatment of hot gasses nevertheless results in substantial savings because the air cleaning plant need not be provided with cooling towers or because the number of cooling towers may be reduced. The resistance offered by the air cleaner to the flow of dust-laden air into the diffuser 91 of the tubular member E increases proportionally with the number of nozzles, i.e., proportionally with the number of annular shielding members.

If the apparatus of the present invention is utilized for cleaning of gases which contain a very high percentage of solids and if such solids exhibit the tendency to cling to the surfaces which come in contact therewith, certain parts of the apparatus must be inspected, cleaned and/or exchanged at frequent intervals. Such inspection, cleaning or replacement of parts which are installed in the housing of the air cleaner might involve considerable time so that the cleaner might have to remain idle for longer periods. The situation is somewhat aggravated if the nozzles are installed in the interior of annular shielding members as shown in FIGS. 4 to 7. In order to avoid such time-consuming work, the parts most likely to require frequent inspection may be mounted externally of the housing. This applies mainly for the nozzle or nozzles of the supply conduit or conduits.

An air cleaner wherein the nozzle 114 of the supply conduit 115' is located externally of the housing 121 is illustrated in FIGS. 5 and 6. The diffuser 121 of the tubular member F is vertical but its lower end is connected with a bend 112 which terminates in a horizontal tubular section 112' extending through the side wall 121b so that the throat 113 is located at the outer side of the wall 121b. The liquid bath 120 has a static level 120a and is accommodated in the lower portion or tank 121a of the housing 121. The nozzle 114 of the supply conduit 115' discharges into the throat 113 and defines therewith a narrow annular gap 116 which is sealingly surrounded by an annular shielding member 117 located below the static level 120a and externally of the housing 121. The numerals 122 and 123 respectively denote a spray eliminator and a deflector serving the same purpose as described in connection with FIGS. 1 to 4. The tube 118 has an upwardly extending intake end 119 which is located at the outer side of a skimmer wall 124, and the other end portion of the tube 118 extends through the side wall 121b to feed relatively clean liquid into the annular compartment of the shielding member 117. A suction fan 125 at the top of the housing 121 is driven by a motor 126 and has an outlet 125a which discharges clean air into the atmosphere. It will be seen that the intake end 119 of the tube 118 is located rather close to the static liquid level 120a but at a considerable distance from that zone of the liquid bath 120 which is below the deflector 123 and which normally contains a higher concentration of unsettled solid matter. The solids descending onto the conical or funnel-shaped bottom wall 121c of the tank 121a may be discharged through a clean-out pipe 128 which is provided with a valve 127. The inlet 115 of the supply conduit 115' is located above the static level 120a, but the conduit 115' extends downwardly so that its nozzle 114 is located below the liquid level. The conduit 115' tapers toward the nozzle 114 so that the stream of dust-laden air is accelerated on its way from the inlet 115 to the throat 113. When the air cleaner of FIGS. 5 and 6 is at a standstill, liquid will flow through the gap 116 and will fill the tubular member F as well as the supply conduit 115' up to the static level 120a. However, and since the inlet 115 is located above such level, the liquid cannot escape even when the motor 126 is not running.

It is clear that the spray eliminator 122 may resemble any of the spray eliminators shown in FIGS. 1–4, i.e., it may be of rectangular or circular cross section or it may resemble an inverted U-shaped body as in FIG. 4. The configuration of the deflector 123 will depend upon the configuration of the spray eliminator 122, i.e., if the latter is an inverted U-shaped body which extends all the way between the front and rear walls of the housing 121, the deflector 123 wil lcomprise two separate sheet metal plates of V-shaped cross section which also extend from the rear wall to the front wall of the housing so that all liquid matter trickling down the vertical walls of the spray eliminator will be intercepted and returns into the bath 120 without any splashing to avoid turbulence and resultant delay in sedimentation.

The skimmer wall 124 comprises a curved lower edge portion 124a which is closely adjacent to the bottom wall 121c of the tank 121a. The upper edge portion of the skimmer wall 124 extends above the static level 120a. This skimmer wall also extends all the way between the front and rear walls of the housing 121 if the parts 122, 123 are constructed in a manner as outlined above. The tube 118 extends through a median part of the skimmer wall 124 and its major portion may but need not be located in a horizontal plane. Since the diffuser 111 is not located midway between the side walls 121b, 121d, the bottom wall 121c of the tank 121a is not symmetric so that the clean-out pipe 128 is closely adjacent to the side wall 121b, i.e., the pipe 128 is located at a maximum distance from the intake end 119 of the tube 118. If the housing 121 is of rectangular cross section, the bottom wall 121c preferably resembles a hollow pyramidal body whose apex is located at the upper end of the pipe 128.

The air cleaner of FIGS. 5 and 6 may be modified by replacing the tubular section 112' with a section whose diameter diminishes gradually all the way to the throat 113. Alternately, the diameter of the section 112' may diminish in a direction toward the diffuser 111 so that the sream of dust-laden air entering the inlet 115 is accelerated all the way to the bend 112. It is also possible to mount the annular shielding member 117 directly on the side wall 121b of the housing 121, i.e., a portion of the wall 121b may form part of the shielding member. Furthermore, the air cleaner of FIGS. 8 and 9 may comprise two or more Venturis which receive liquid from a common tube 118 or from separate tubes. The cross-sectional areas of nozzles which deliver air to separate tubular members may be identical or different. The tube 118 may but need not be located at a level below the tubular section 112' of the tubular member F. For example, this tube 118 may be located at the same level as the nozzle 114 and section 112'. Obviously, the tube 118 may be replaced by two or more separate tubes each of which discharges into the shielding member 117. If the apparatus of FIG. 5 comprises two liquid-admitting tubes, they may be mounted at the same level as but at the opposite sides of the section 112', and the intake end of each such tube will be located to the left of the skimmer wall 124, as viewed in FIG. 5. The diffuser 111 (or a row of such diffusers) may be located centrally between the side walls 121b, 121d; in such air cleaners, the chamber 121e of the housing 121 may accommodate two skimmer walls, one at each side of the diffuser or diffusers 111 and the skimmer walls are preferably mounted in such a way that the right-hand portion of the apparatus, as viewed in FIG. 6, is mirror symmetrical to the left-hand portion. The skimmer walls are then arranged in planes which are normal to the plane of FIG. 9, and the intake ends of the liquid-admitting tubes will be located outwardly of such skimmer walls.

A further very important advantage of the apparatus shown in FIGS. 5 and 6 is that the stream of dust-laden air entering at 115 remains in longer-lasting contact with the liquid, i.e., all the way from the shielding member 117 and at least to the top baffle 122a of the spray eliminator 122. This also contributes to superior cleaning or dust removing action of the apparatus.

It is further clear that the motor and the suction fan need not be mounted on the housing of the improved gas cleaning apparatus. For example, the motor 126 and the fan 125 shown in FIG. 5 can be mounted on a platform which is connected to the side wall 121b or, if desired, both the motor and the fan may be located at a certain distance from the housing 121. Furthermore, instead of resorting to a suction fan, the apparatus of my invention may comprise a blower whose pressure side is connected with the feed pipe or with the supply conduit so that the stream of dust-laden air or another gas is blown, rather than sucked, into the diffuser of the Venturi.

An advantage common to all embodiments of my apparatus is that the liquid which is used to remove solid impurities from the gas is circulated in response to flow of one or more gaseous streams into and from the housing. Thus, the liquid need not be circulated by resorting to pumps, special nozzles and other costly and bulky accessories. The liquid is atomized in a fully automatic way because the gas enters the throat of the Venturi in a zone which is located below the liquid level, at least when the apparatus is in actual use. In other words, the liquid need not be subjected to pressure generated by a pump or the like in order to enter the stream of dust-laden gas and to be atomized so as to form a large number of small globules which will provide a film around the solid impurities.

What is claimed as new and desired to be protected by Letters Patent is:

1. A gas cleaning apparatus comprising a tubular member having a throat and a diffuser at least a portion of which extends upwardly from and communicates with said throat; supply conduit means comprising a nozzle having a discharge end which is at least partly surrounded by and defines a gap with said throat; substantially closed shielding means surrounding said nozzle and said throat and defining an internal compartment which communicates with the interior of said tubular member through said gap; a tank having a diffuser extending upwardly therein and containing a liquid bath having a surface located at a level which is at least as high as the level of said discharge end, at least when the apparatus is in use; at least one liquid conveying tube having an intake end immersed in said bath and extending upwardly near the surface thereof and a second end connected with said shielding means so that liquid entering through said intake end flows into said compartment and rises through said gap to overflow the discharge end of said nozzle; means for conveying a stream of solids-containing gas through said conduit means so that such gas atomizes the overflowing liquid on its way from said nozzle into said diffuser whereby the particles of atomized liquid adhere to solids in said stream; spray eliminator means in said tank for separating the solids and liquid matter from the gas which issues from said diffuser and for directing such matter into a predetermined portion of said bath, said intake end of the tube being immersed in a second portion of said bath spaced from said predetermined portion so that the liquid entering said gap contains a relatively low percentage of impurities; and at least one skimmer wall means dipping into the bath between said predetermined portion and said second portion to prevent unimpeded circulation if unsettled solid matter from said predetermined portion into said second portion.

2. A gas cleaning apparatus as defined in claim 1, wherein said shielding means are accommodated in said tank and wherein said liquid conveying tube is fully immersed in said bath.

3. A gas cleaning apparatus as set forth in claim 2, wherein said supply conduit means extends downwardly into said bath and has an inlet located above the surface of said bath.

4. A gas cleaning apparatus as defined in claim 1 wherein said nozzle is located outside of said tank.

5. A gas cleaning apparatus as set forth in claim 4, wherein said supply conduit has an inlet which is located at a level above the surface of said bath.

6. A gas cleaning apparatus as set forth in claim 5, wherein the cross-sectional area of said supply conduit diminishes gradually in a direction toward said nozzle.

7. A gas cleaning apparatus as defined in claim 1 wherein said supply conduit has a plurality of sections each comprising a nozzle at the discharge end thereof and a throat at the intake end thereof, each of said nozzles extending into and defining a gap with one of said throats, including the throat of said tubular member, and wherein a plurality of said shielding means are provided each sealingly surrounding one of said nozzles and the respective throat and each defining a compartment which communicates with the interior of the respective throat through the corresponding gap, said liquid admitting tube communicating with each of said compartments.

8. A gas cleaning apparatus as set forth in claim 7, wherein at least one of said nozzles has a substantially horizontal axis.

References Cited

UNITED STATES PATENTS

| | | | |
|---|---|---|---|
| 691,170 | 1/1902 | Pardridge | 261—76 |
| 941,676 | 11/1909 | Green | 55—249 |
| 1,331,600 | 2/1920 | Wales | 261—76 |
| 1,371,562 | 3/1921 | Kent | 55—257 |
| 1,606,032 | 11/1926 | Kolstrand | 55—248 |
| 2,380,065 | 7/1945 | Newcomb | 55—249 |
| 2,632,523 | 3/1953 | Stephens et al. | 55—468 |
| 2,715,521 | 8/1955 | Tatibana | 261—77 |
| 2,790,506 | 4/1957 | Van Vactor | 55—249 |
| 2,832,432 | 4/1958 | Fanton | 55—249 |
| 3,131,237 | 4/1964 | Collins | 55—249 |
| 274,839 | 3/1883 | Sturtevant | 103—264 |
| 642,046 | 1/1900 | Miller | 103—264 |
| 1,737,684 | 12/1929 | Reynolds | 230—92 |

FOREIGN PATENTS

| | | |
|---|---|---|
| 233,933 | 5/1961 | Australia. |
| 636,066 | 2/1962 | Canada. |
| 843,294 | 3/1939 | France. |
| 527,595 | 10/1940 | Great Britain. |
| 211,405 | 2/1924 | Great Britain. |

OTHER REFERENCES

German patent application 1,026,263, dated March 1958, inventor Reich.

HARRY B. THORNTON, Primary Examiner

B. NOZICK, Assistant Examiner

U.S. Cl. X.R.

55—257, 419, 439, 468; 103—263; 230—95; 261—77, 124